March 4, 1958 L. H. NEWBROUGH 2,825,803
CRASH POSITION SIGNALLING INDICATOR
Filed June 3, 1955 3 Sheets-Sheet 1

INVENTOR.
LOUIS H. NEWBROUGH
BY
ATTORNEYS

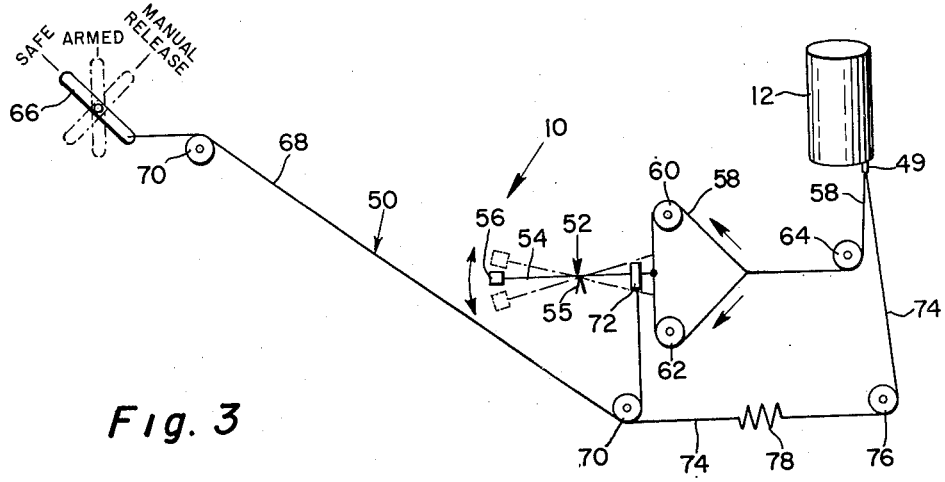
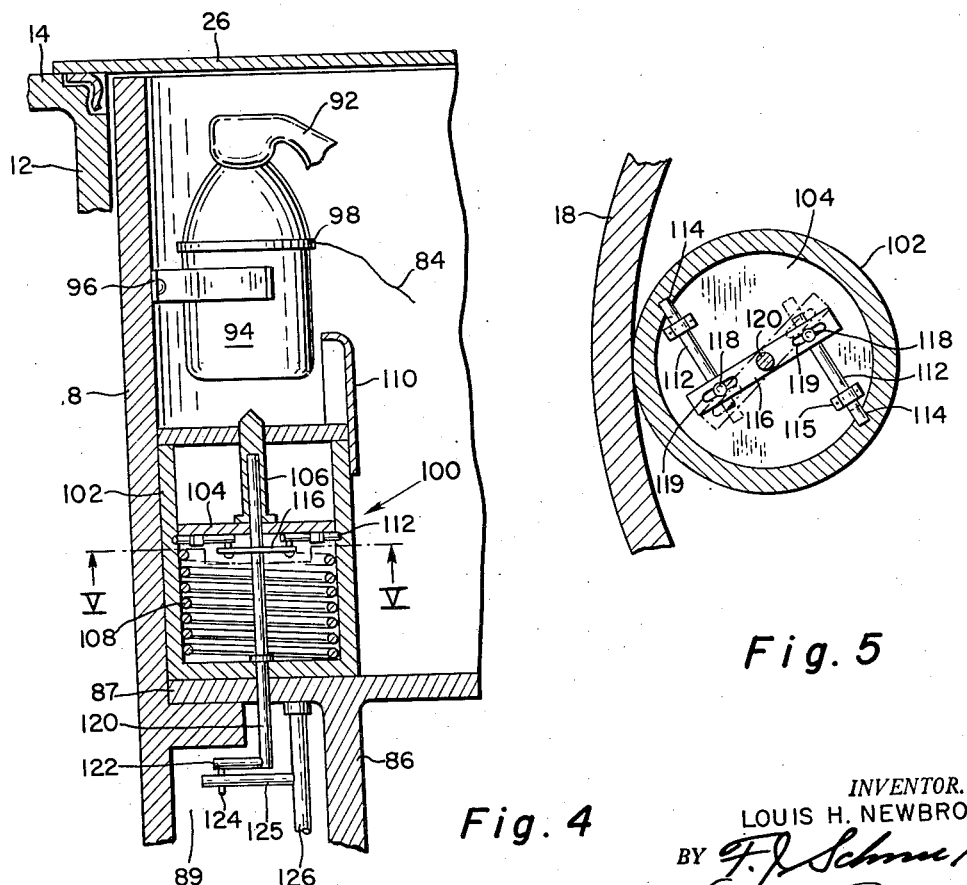

March 4, 1958   L. H. NEWBROUGH   2,825,803
CRASH POSITION SIGNALLING INDICATOR

Filed June 3, 1955   3 Sheets-Sheet 3

INVENTOR.
LOUIS H. NEWBROUGH
BY
ATTORNEYS ns Patent Office 2,825,803
Patented Mar. 4, 1958

2,825,803

CRASH POSITION SIGNALLING INDICATOR

Louis H. Newbrough, El Cajon, Calif.

Application June 3, 1955, Serial No. 513,171

4 Claims. (Cl. 250—17)

(Granted under Title 35, U. S. Code (1952), sec. 266)

The invention described herein may be manufactured and used by or for the Government of the United States of America for governmental purposes without the payment of any royalties thereon or therefor.

This invention relates to markers and more particularly to improvements in signalling and locating devices for ditched vehicles.

The need for emergency crash apparatus to indicate the position of a crashed or ditched vehicle, whether it be an aircraft, submarine, surface craft or the like, has been recognized and, as can be expected, various equipment has been devised to cope with this emergency. Some of such survival equipment utilize a crash-ejected signalling capsule or shell without positively latching the ejection mechanism. While in other mechanisms no suitable operational control is provided making it possible to accidentally discharge the device, especially in carrier-operations where aircraft are subjected to large landing impact as an operational requirement. Accidental release of the indicator is costly, and in some types of equipment an emergency signal is automatically transmitted causing a needless alarm.

The cost of most rescue operations is quite substantial considering the size and the number of activities that usually participate, and particularly those operations which are prolonged because of the absence of accurate information regarding the time of the crash.

According to the invention the crash position indicator comprises a housing fixed to the vehicle for an ejectable shell which contains the indicating means. A latching mechanism is provided for securing the shell to the housing being operable by a release mechanism either automatically by a force-responsive device upon crash of the vehicle, or through manual operation by the vehicle operator. A safety lock accessible to the operator is provided to disarm the force-responsive device when conditions warrant such action. A clock mechanism may be mounted in the shell and operable when the shell is ejected to record elapsed time since the crash. A radio transmitter and power source may also be mounted in the shell and associated with the clock mechanism to transmit a periodic emergency signal. The shell may also house a spool of antenna wire that is elevated and suspended in the air by a balloon inflated upon shell ejection.

A principal object is to provide a position indicator having an ejectable shell with a positive latching means to prevent accidental displacement of the shell, and having force-responsive means for automatically releasing the latching device when the vehicle is subjected to a predetermined impact.

A further object is to provide a manual control over the release mechanism, the force-responsive means, and to enable the shell to be manually released by the vehicle operator.

Another object is to provide a clock mechanism for recording elapsed crash time, and which mechanism may be associated with a radio transmitter for keying the transmission of periodic emergency signals.

Still other objects are to provide a crash indicator having a compact and buoyant construction; and to provide such an indicator with a cylindrical inflated balloon and a puncturing mechanism therefor having a latch mechanism to prevent accidental release.

Other objects and many of the attendant advantages of this invention will be readily appreciated as the same becomes better understood by reference to the following detailed description when considered in connection with the accompanying drawings wherein:

Fig. 3 is a diagrammatic view of a manual control system including a force-responsive mechanism for automatically releasing the latch mechanism;

Fig. 4 is an enlarged section of the gas balloon cylinder and puncturing mechanism;

Fig. 5 is an enlarged bottom plan of the puncturing mechanism taken along line V—V of Fig. 4;

Figures 1, 2:
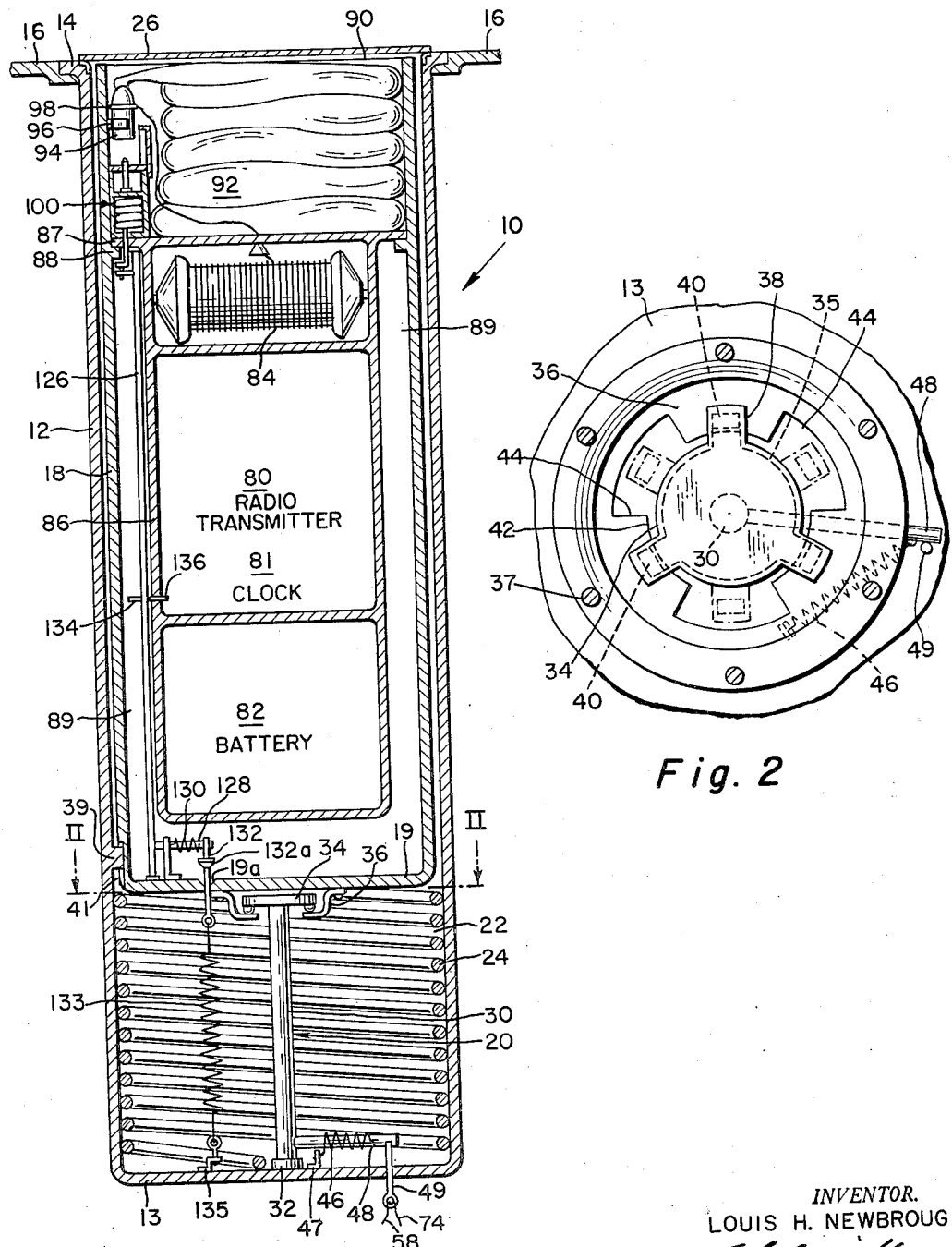
Fig. 1 is a longitudinal section of the crash position indicator of this invention.
Fig. 2 is an enlarged top plan taken along line II—II of Fig. 2 showing the latch mechanism in locked and released positions.

Referring now to the drawings, wherein like reference characters designate like or corresponding parts throughout the several views there is shown generally in Fig. 1, a crash position indicator 10 which comprises a housing 12 preferably cylindrical having a bottom wall 13 and an open upper end delineated by a peripheral flange 14 for permanent attachment to a fuselage skin 16 of an aircraft or the outer surface of another vehicle on which the indicator may be employed. The most suitable location for the indicator on aircraft is inside the fuselage on the upper contour just forward of the vertical stabilizer and installed at any desirable discharge angle.

An ejectable shell 18 having a bottom wall 19 is concentrically disposed and slidably mounted within housing 12, the shell being secured therein by a latching mechanism 20 connected between the bottom walls of the housing and shell in a space 22 therebetween. Space 22 is also occupied by a shell ejector, such as a coil spring 24, that is maintained under compression by the latching mechanism until released automatically or manually at the discretion of the pilot or operator. The open ends of both shell 18 and housing 12 are sealed by a cover 26, snap-attached to the housing, as shown in Fig. 4, and displaceable by the ejected shell, the shell containing a plurality of signalling components energized upon ejection and later to be described.

Latch mechanism 20 is conveniently housed in the core of ejector spring 24, and includes an axially extending shaft 30 having its base journalled at 32 to the housing and terminating at the upper end in an integral latch plate 34 adapted to releasably engage a catch plate 36 secured by screws 37 to shell bottom 19. Referring to Fig. 2, latch plate 34 is fabricated with a peripheral flange 35 along its edge to provide rigidity, and is provided with a plurality of radially extending arms 38, three being shown, on which are transversely supported casters 40. In the locked position, as illustrated in solid lines, each caster 40 engages a corresponding latch tab 42 formed on plate 36, and in a released position, shown in broken lines, latched plate 34 has been rotated to where the casters have rolled into recesses 44 between tabs 42, at which time the shell is free to be propelled out of the housing by spring 24. Latch shaft 30 is spring urged to the released position by a tension spring 46 connected to one end to a shaft arm 48 and anchored at the other end by lug 47 to the housing bottom 13. The latch mechanism is locked in a tensioned position by a release pin 49 which slidably projects through housing bottom wall 13 and extends into the path of shaft arm 48 to prevent shaft rotation by spring 46 until release is effected by the withdrawal of pin 49.

To avoid accidental release of latch mechanism by rotation of shell 18, one or more guides may be provided to hold the shell suffciently rigid within housing 12, and may comprise a spline 39 integrally formed on the housing bore and adapted to slidably engage a keyway 41 in the housing to permit only a longitudinal movement therebetween.

An important feature of the invention is to provide both an automatic and manual control over the withdrawal of pin 49 and the release of the latch mechanism, and this is performed by a release and control mechanism 50, shown in Fig. 3, the controls being located near the operator, such as the cockpit of an aircraft. Automatic release of pin 49, resulting in the release of compressed ejection spring 24, is accomplished by a force-responsive device 52 operable whenever the aircraft is subjected to a predetermined impact, and in the illustrated embodiment, the force-responsive device comprises a weighted lever 54 pivoted at 55 around a horizontal axis. One end of lever 54 has a weight 56 and the other end is secured to the midpoint of a lanyard 58 which extends around a series of pulleys and attached to pin 49. Pulleys 60 and 62, located on opposite sides of the secured end of lever 54, are encircled by a loop of the lanyard, the midpoint of the other side of the loop being connected to pin 49 around a pulley 64 in a manner to ensure that pin 49 will be pulled out by either vertical movement of the weighted lever, indicated by the arrows.

As a precaution against accidental operation of force-responsive device 52, there is provided a control lever 66 connected by a cable 68 threaded around pulleys 70 to an arming pin 72 which is capable of releasably locking balance lever 54 in a secured condition. Control lever 66 can be located in the cockpit readily accessible to the pilot, and in a Safe position, shown in solid lines in Fig. 3, arming pin 72 secures balance lever 54 in an inoperative position to disarm the force-responsive device. The pilot can position control lever 66 at Safe to ensure against accidental shell release that might otherwise occur during carrier landing or during any other operation such as stowage. At all other operations, the automatic force-responsive device 52 is armed by moving control lever 66 to an Arm position, actuating cable 68 to unlock arming pin 72 and balance lever 54 and permit automatic shell ejection.

A further arrangement is provided for manual release of release pin 49 by the pilot moving control lever 66 to a third position, Manual Release, whenever the need arises. Cable 68 is furnished with an extension 74 connected directly to release pins 49 around a pulley 76, whereby the automatic force-responsive device 52 can be by-passed for manual release. An expandable portion 78 of extension 74 enables lever movement between Safe and Arm without pulling pin 49. Accordingly, release mechanism 50 affords the pilot an opportunity to select either automatic or manual release of shell ejection, or if the occasion necessitates to disarm automatic operation.

As previously noted, shell 18 contains a plurality of signalling and indicating components that are energized upon shell ejection. Referring to Fig. 1, a conventional radio transmitter 80, a battery source 82 and a spool of antenna wire 84 for the transmitter are housed within suitable compartments of a water-tight casing 86 having a peripheral lip 87 for suspension from an intermediate shell flange 88. Casing 86 is disposed in spaced relation to the sides and ends of the shell to ensure a positive buoyancy, and, if desired, spaces 89 below flange 88 may be filled with a buoyant material, such as polystyrene, not shown, which will also provide improved cushioning of the components to shock of ejection and the subsequent shell landing on water or terrain. Space 90 in the shell above casing 86 provides stowage for a suitably colored balloon 92 inflatable from a gas cylinder 94 containing a lighter-than-air gas, the cylinder being releasably supported by a spring bracket 96 attached to the shell. One end of antenna wire 84 is connected to the transmitter through the hollow insulated spool shaft and the initial several feet of the wire is adequately insulated to prevent grounding by the ejector, terrain or water. The free end of the antenna wire is connected to cylinder 94 by strap 98 for elevation into the air when the balloon is inflated by the action of a cylinder-puncturing mechanism 100, shown in Figs. 4 and 5.

Puncturing mechanism 100 comprises a cylinder 102 mounted along the interior wall of the shell, and a piston 104 having an axially extending sharpened pin 106 aligned directly below gas cylinder 94 and adapted to puncture the latter when propelled by ejection spring 108. A shield 110 extends above and around the cylinder to prevent any interference from the balloon. The puncturing mechanism is latched in a safe position, shown in solid lines in Fig. 5 by a pair of horizontally opposed latch pins 112 adapted to extend into drilled seats 114 formed in the cylinder wall, each pin 112 being slidably mounted in a bracket 115 and actuated by an arm 116 to a released position, shown in broken lines, through a floating pivot 118 riding in an elongated slot 119. Arm 116 is fixed to and movable by a control shaft 120, the latter having an upper end journalled within puncturing pin 106 and the other shaft end freely extending down through the cylinder bottom and into space 89 terminating in a radial arm 122 having a cross-pin 124 arranged in the path of a corresponding radial arm 125 extending from a release shaft 126. As shown in Fig. 1, release shaft 126 extends co-extensive with casing 86 being journalled to casing flange 87 and shell bottom 19, and has a lower radial arm 128 anchored to the bottom by a tension spring 130. Release shaft 126 is locked in a spring-biased position by a pin 132 slidably extending through shell bottom 19 into the path of arm 128, which pin 132 is connected to and automatically withdrawn sufficiently to release arm 128 by a lanyard 133 when the shell is ejected. To maintain the watertight integrity of space 89 when shell 18 is waterborne, pin 132 is provided with a cone-shaped flange 132a adapted to be wedged in a corresponding pin opening 19a in the shell bottom to seal the shell. Lanyard 133 may be a coil wire anchored to a lug 135 on housing base 13, and is capable of being severed by shell ejection. The above release mechanism and lanyard 133 affords a sufficient time delay from shell ejection to balloon inflation to ensure that the shell travels a sufficient distance from the aircraft to avoid fouling therewith.

Rotation of release shaft 126 upon shell ejection is also utilized to energize radio transmitter 80 and clock mechanism 81 through an intermediate arm 134 which actuates a switch 136 (Fig. 1) extending through the side wall of casing 86 and connected to a conventional transmitter control circuit.

Figure 6:
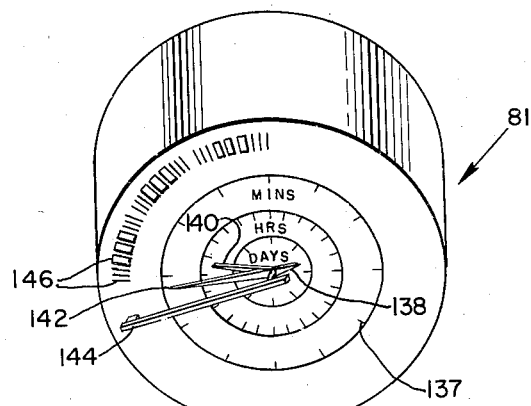
Fig. 6 is a top perspective view of a clock recording and signalling device.

Clock mechanism 81, shown in Fig. 6 consists basically of a conventional eight-day spring clock equipped with a dial 137 and having three hands 138, 140 and 142 to record elapsed time in days, hours and minutes, respectively, from shell ejection which is the time of the crash landing. In addition, a minute sweep hand 144 is provided for keying the radio transmitted signal. Sweep hand 144 during rotation engages a series of raised spaced contacts or symbols 146, preferably constructed both narrow and wide to simulate the dot-dash of Morse code letters "SOS." Both hand 144 and symbols 146 are insulated from the clock so that the intermittent contact completes the radio circuit and results in the transmission of a series of distress signals on a prescribed frequency for a given period. As shown in Fig. 6 three signals are transmitted in a 15 second period followed by a 45 second period of silence, although any other arrangement can be provided. Thus, the clock mechanism not only serves to key the transmission of the emergency signal, but also records the elapsed time from the crash.

Figure 7:
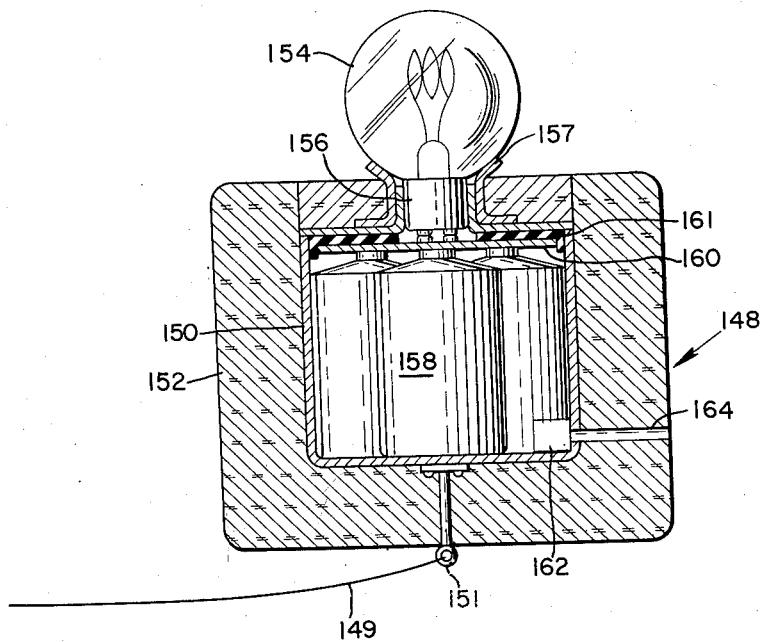
Fig. 7 is a cross-section of a light signalling float.

To provide a suitable signalling device to aid in retrieving shell 18 especially during adverse conditions of visibility and darkness, the light float 148, as shown in Fig. 7, may be nested in deflated balloon 92 and ejected by balloon inflation the float being attached to the shell by a cord 149 anchored in the float by a hook 151. Float 148 comprises an inner container 150 encased by a covering 152 made of a suitable buoyant material, such as cork, and having a top opening through which extends a light bulb 154 mounted in a socket 156 which can be integral with container 150, and sealed therein by a sleeve 157. Batteries 158 are housed within container 150 and electrically connected to the bulb by a contact plate 160 insulated from container 150 by a ring 161. A salt water switch 162 having a water inlet 164, below the water line, is mounted in the bottom of container 150 and connects the battery source to the light bulb upon immersion. The light bulb may be arranged to emit a steady or blinking light to assist in recovery of the survivor and the expended shell.

Operation of the indicator may be initiated automatically upon impact of the crashed vehicle by the force-responsive device 52 (Fig. 3), or manually by pilot manipulation of control lever 66; in either instance release pin 49 is withdrawn from housing bottom 13 permitting rotation of shaft 30 and release latch mechanism 20. Shell 18 no longer being restrained is free to be propelled outward from the housing into free space by ejector spring 24 displacing cover 26 in its path. When lanyard 133 has reached the limit, release pin 132 is also yanked into shell bottom 19 permitting rotation of shaft 126 energizing transmitter 80 and clock signalling mechanism 81 through engagement of switch 136 by arm 134, and also releasing cylinder puncturing mechanism 100 to inflate balloon 92. Balloon inflation ejects the nestled light float 148 and extends antenna wire 84 for periodic transmission of the emergency signal by the energized transmitter as controlled by sweep arm 144 and contacts 146 of clock-signalling mechanism 81 which automatically commences to record elapsed time. Shell 18 floats on the water, if such is the case, aided by the buoyant provisions in the shell spaces 89, and light float 148 upon immersion commences to emit a steady or blinking light. The indicator continues to function to aid rescue operations until recovery, at which time the clock signalling mechanism will indicate the elapsed time enabling rescuers to accurately determine time of crash and to decide whether to abandon or continue further rescue operations if such is the case.

The indicator of this invention offers advantages in construction, positive operation of the latching mechanisms, and more versatility in control. The housing shell and container are compactly arranged as a sealed unit and the component devices easily assembled therein. Both the shell and cylinder puncturing mechanism are controlled by latches which prevent accidental release, the latches being operated by positive action. Manual arming by the pilot of the force-responsive device reduces the likelihood of accidental release, and further provides a manual release of the shell should the occasion necessitate. A sufficient time delay is provided between shell ejection and balloon inflation to prevent fouling by the aircraft. Upon energization, the indicator commences to record the elapsed time while transmitting suitable emergency signals and offering visible indications of crash location.

Obviously many modifications and variations of the present invention are possible in the light of the above teachings. It is therefore to be understood that within the scope of the appended claims the invention may be practiced otherwise than as specifically described.

I claim:

1. Vehicle crash position indicator comprising a cylindrical housing adapted to be mounted to the vehicle, an ejectable cylindrical shell positioned in the housing, one end of the shell being spaced from the end of the housing, means for latching the shell within the housing, means for automatically releasing said latch means when the vehicle is subjected to a predetermined impact, means for ejecting the shell from the housing upon release, said latch means comprising a freely rotatable shaft journalled at one end to the housing along the longitudinal axes thereof, and at the other end engageable with a catch exteriorly mounted to the shell, resilient means for rotating the shaft to disengage the latch, and cooperating means on the housing and shell for preventing rotation therebetween while permitting a longitudinal movement of the shell during ejection.

2. Vehicle crash position indicator comprising a tubular housing adapted to be mounted to the vehicle, an ejectable tubular shell positioned in the housing and spaced from one end thereof, means located in said space for ejecting the shell, a rotatable latch mechanism in said space for securing the shell to the housing against longitudinal movement, said latch mechanism comprising a longitudinal shaft journalled at one end to the housing and at the other end engageable with a catch at a base end of said shell, resilient means for urging said latch mechanism to a release position, a release pin for restraining said mechanism in a latched position, force-responsive means for automatically releasing the latch mechanism by withdrawing the release pin from the latch mechanism when the vehicle is subjected to a predetermined impact, and means connected directly to the release pin for manual release of the pin.

3. The indicator of claim 2 wherein said shell is provided with an open compartment for housing a deflated balloon connected to an aerial, a gas cylinder for inflating said balloon, cylinder puncture mechanism operable upon ejection of the shell, means for actuating said puncture mechanism comprising a second longitudinal shaft extending in said shell journalled at one end, resilient means for urging said shaft to a released position, a pin extending through said base of the shell to restrain said resilient means, a lanyard connecting the pin to the housing for reelasing said shaft by ejection of the shell.

4. The indicator of claim 3, wherein, said shell contains a radio transmitter, a clock mechanism for recording the elapsed time of the crash, said radio transmitter and clock mechanism being actuated by rotation of said second shaft.

References Cited in the file of this patent

UNITED STATES PATENTS

| | | |
|---|---|---|
| 944,715 | Blodgett | Dec. 28, 1909 |
| 1,767,192 | Stapleton | June 24, 1930 |
| 1,874,185 | Goldstein | Aug. 30, 1932 |
| 2,149,808 | Ellis | Mar. 7, 1939 |
| 2,486,932 | Elliott | Nov. 1, 1949 |
| 2,500,809 | Fennessey et al. | Mar. 14, 1950 |
| 2,628,307 | Lloyd et al. | Feb. 10, 1953 |

FOREIGN PATENTS

| | | |
|---|---|---|
| 135,441 | Great Britain | Nov. 27, 1919 |